US008102516B2

(12) United States Patent
Imamura

(10) Patent No.: US 8,102,516 B2
(45) Date of Patent: Jan. 24, 2012

(54) TEST METHOD FOR COMPOUND-EYE DISTANCE MEASURING APPARATUS, TEST APPARATUS, AND CHART USED FOR THE SAME

(75) Inventor: Norihiro Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 231 days.

(21) Appl. No.: 12/597,095

(22) PCT Filed: Feb. 24, 2009

(86) PCT No.: PCT/JP2009/000805
§ 371 (c)(1),
(2), (4) Date: Oct. 22, 2009

(87) PCT Pub. No.: WO2009/107365
PCT Pub. Date: Sep. 3, 2009

(65) Prior Publication Data
US 2010/0128249 A1 May 27, 2010

(30) Foreign Application Priority Data
Feb. 26, 2008 (JP) ................................. 2008-044864

(51) Int. Cl.
*G01C 25/00* (2006.01)
(52) U.S. Cl. ............................................................. 356/6
(58) Field of Classification Search ........................ None
See application file for complete search history.

(56) References Cited

U.S. PATENT DOCUMENTS

| | | | | |
|---|---|---|---|---|
| 5,668,626 A * | 9/1997 | Shin et al. | ..................... | 356/3.08 |
| 6,366,240 B1 * | 4/2002 | Timothy et al. | ............... | 342/417 |
| 6,404,484 B1 | 6/2002 | Sogawa | | |
| 6,847,392 B1 * | 1/2005 | House | ............................. | 348/36 |

(Continued)

FOREIGN PATENT DOCUMENTS
JP 06-221832 8/1994
(Continued)

OTHER PUBLICATIONS

Oyama, Ichiro, et al., "*Distance Detective Small Camera Module*", Proceedings of SPIE vol. 6501, Electronic Imaging 2007—The IS&T/SPIE 19th Annual Symposium on San Jose, CA, USA, Jan. 28-Feb. 1, 2007.

(Continued)

*Primary Examiner* — Tu Nguyen
(74) *Attorney, Agent, or Firm* — Wenderoth, Lind & Ponack, L.L.P.

(57) ABSTRACT

Provided is a test method for accurately testing all regions within a field of view and evaluating, by one-time capturing, accuracy of a distance measured by a compound-eye distance measuring apparatus having two baseline directions. The test method includes: placing a test chart at a predetermined distance from a compound-eye distance measuring apparatus; measuring a distance to the test chart by the compound-eye distance measuring apparatus; and calculating a difference between the predetermined distance and the measured distance, and evaluating whether the calculated difference is within a predetermined value range, wherein, on the test chart, elements in a predetermined geometric pattern are two-dimensionally arranged in the first arrangement direction and the second arrangement direction, the first arrangement direction being tilted by a predetermined angle with respect to the first baseline direction, and the second arrangement direction being tilted by a predetermined angle with respect to the second baseline direction.

16 Claims, 15 Drawing Sheets

(a)

(b)

U.S. PATENT DOCUMENTS 7,949,179 B2 * 5/2011 Ikeuchi et al. ................ 382/154
2002/0134839 A1 9/2002 Iwaki

FOREIGN PATENT DOCUMENTS

| JP | 2001-091247 | 4/2001 |
|---|---|---|
| JP | 2001-272210 | 10/2001 |
| JP | 2002-286415 | 10/2002 |
| JP | 2004-069437 | 3/2004 |
| WO | 2008/075632 | 6/2008 |

OTHER PUBLICATIONS

International Search Report mailed Apr. 14, 2009 in International (PCT) Application No. PCT/JP2009/000805.

* cited by examiner

FIG. 1
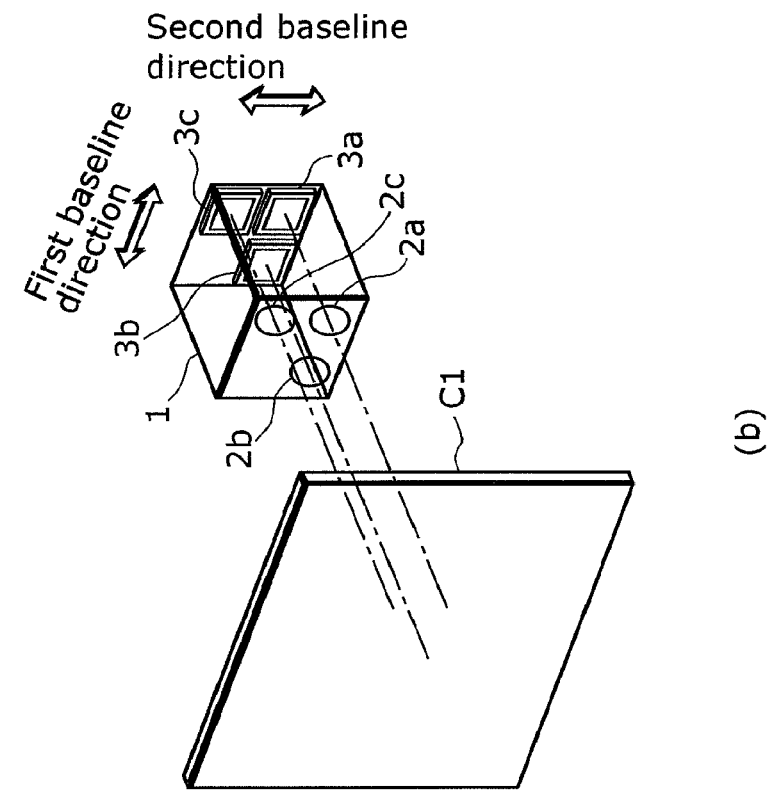
(b)
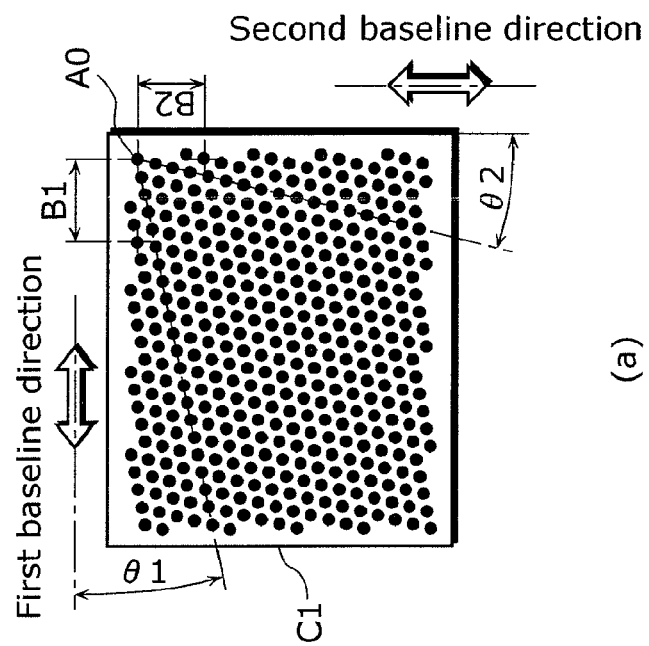
(a)

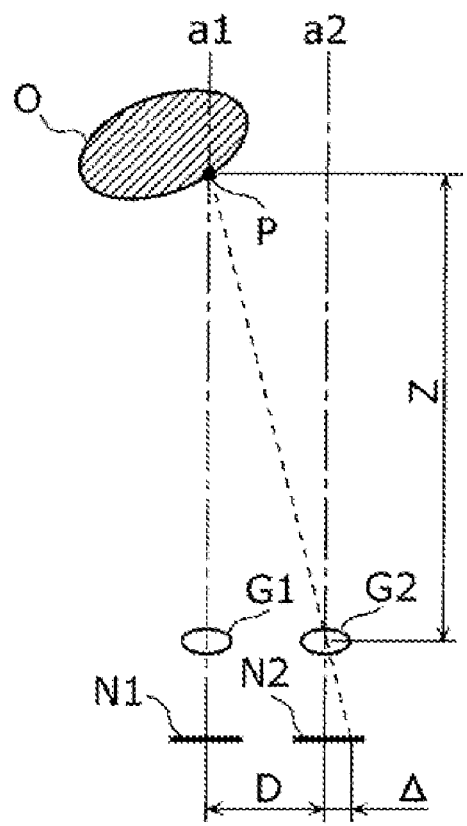
FIG. 15 - PRIOR ART

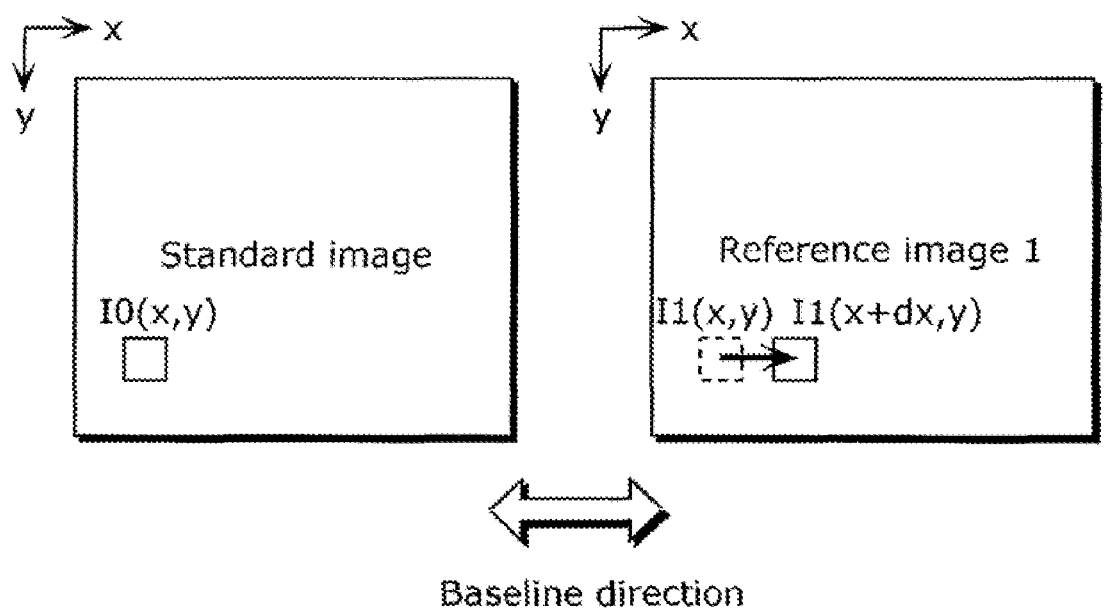
FIG. 16 - PRIOR ART

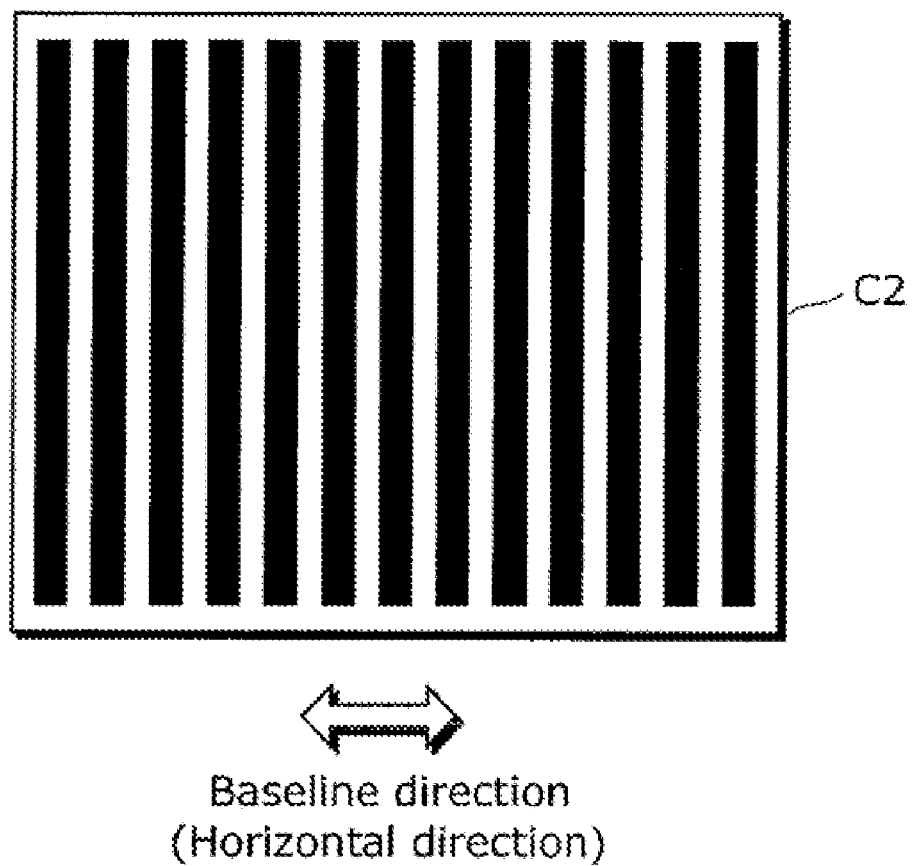
FIG. 17 - PRIOR ART
Baseline direction
(Horizontal direction)

TEST METHOD FOR COMPOUND-EYE DISTANCE MEASURING APPARATUS, TEST APPARATUS, AND CHART USED FOR THE SAME

TECHNICAL FIELD

The present invention relates to test methods for compound-eye distance measuring apparatuses, and in particular to (i) a test method for evaluating accuracy of a distance measured by a compound-eye distance measuring apparatus which has the first baseline direction and the second baseline direction and measures a distance to a measurement object with a disparity in the first baseline direction and a disparity in the second baseline direction which are obtained from at least three imaging optical systems, (ii) a test apparatus, and (iii) a chart used for the same, the first baseline direction and the second baseline direction being different from each other.

BACKGROUND ART

A compound-eye distance measuring apparatus, which causes an imaging device including a pair of imaging optical systems to capture a measurement object and obtains two images that are either left and right images or top and bottom images, calculates a distance to the measurement object using the triangulation principle. Such a compound-eye distance measuring apparatus is used for inter-vehicle distance measurement for automobile, an autofocus system for camera, and a three-dimensional shape measuring system.

FIG. 15 is a diagram showing triangulation performed by a compound-eye distance measuring apparatus. In FIG. 15, G1 is an imaging lens of the first imaging optical system, N1 is an image sensor plane of the same, G2 is an imaging lens of the second imaging optical system, and N2 is an image sensor plane of the same. Here, when a point P on a measurement object O is a measurement point and the point is on an optical axis of the first imaging optical system, the first imaging optical system forms an image of the point P on an image sensor plane on an optical axis a1 and the second imaging optical system forms an image of the point P on an image sensor plane located at a distance from an optical axis a2 by Δ in a baseline direction. Here, when a distance from each of the imaging lenses to the point P is Z, a baseline length that is inter-optical-axis distance between the two imaging optical systems G1 and G2 is D, a focal length of each imaging lens is f (for both G1 and G2), and a disparity is Δ an approximate equation as shown by the following Equation 1 holds.

$$\Delta \approx D \cdot f / Z \qquad \text{Equation 1}$$

It is possible to extract the distance Z to the point P by modifying Equation 1, because Δ can be extracted by performing pattern matching an image obtained by the first imaging optical system and an image obtained by the second imaging optical system. A degree of correlation of the pattern matching can be determined with evaluation function SAD (Sum of Absolute Differences) that is a sum of differences (absolute value) in brightness of each of pixels between a small region in a standard image obtained by the first imaging optical system and a small region in a reference image obtained by the second imaging optical system. Here, when a calculation block size of the small region is m×n pixels, the SAD can be determined with the following Equation 2.

[Math. 1]

$$\sum_{i=0}^{m-1} \sum_{j=0}^{n-1} |I0(x+i, y+j) - I1(x+dx+i, y+j)| \qquad \text{Equation 2}$$

In Equation 2, x and y are coordinates on each of the image sensor planes, and I0 and I1 are a brightness value of the standard image and a brightness value of the reference image which are on coordinates in parenthesis, respectively. FIG. 16 is a diagram showing SAD calculation. The SAD calculation is performed while a position of a search block region in the reference image is displaced, with respect to a standard block region in the standard image, by dx in a baseline direction as shown in FIG. 16, and dx causing a SAD to be the minimum is the disparity Δ. It is possible to obtain distance information of all regions within a field of view, because a SAD can be calculated with any coordinates.

The compound-eye distance measuring apparatus needs testing whether or not distance measuring accuracy meets specific standards, because obtained distance information varies due to, for instance, variation in performance of an imaging optical system, an image sensor, or the like, assembly errors, and calibration errors.

Examples of a chart for evaluating the distance measuring accuracy of the compound-eye distance measuring apparatus include a chart C2 on which a two-tone lattice pattern is drawn as shown in FIG. 17, and a chart on which a multi-tone brightness pattern is randomly arranged and drawn as described in Patent Reference 1.

Patent Reference 1: Japanese Unexamined Patent Application Publication No. 2001-091247

DISCLOSURE OF INVENTION

Problems that Invention is to Solve

It is necessary to set a SAD search range to cover a disparity range obtained when performing capturing from the longest distance to the shortest distance of a distance measurement object range, because a disparity obtained when a compound-eye distance measuring apparatus captures a measurement object varies depending on a distance to the measurement object. On the other hand, although it is necessary to fine down a pattern of a chart to increase a plane resolution of distance measuring, matching spots within the SAD search range appear and a disparity cannot be accurately detected, because a pitch of a lattice pattern formed on an image sensor plane becomes fine when the pitch of the lattice pattern is finely set on a chart having the lattice pattern as shown in FIG. 17 and because lattice patterns appear within the search range when the SAD search range is wide. Thus, in order to detect the disparity accurately, it is necessary to set the pitch of the lattice pattern to be large so that the number of matching spots within the search range is one. However, when the pitch of the lattice pattern is set large, because a spot where no contrast exists within a calculation block appears and pattern matching cannot be performed when a size of the calculation block is set smaller than the lattice pattern, a problem occurs that the distance measuring cannot be performed at the spot. Conversely, a problem exists that the plane resolution of the distance measuring decreases, because the size of the calculation block needs to be increased so that contrast always exists within the calculation block.

Furthermore, although the minimum value sharply appears in the SAD calculation when the distance measurement object has high contrast, it is difficult to detect the disparity because the minimum value does not sharply appear when the object has low contrast. Accordingly, since contrast of each of adjacent brightness patterns differs from spot to spot on a chart where a brightness pattern is randomly arranged as in Patent Reference 1, when pattern matching accuracy by the SAD calculation varies depending on the contrast or random arrangement causes a periodical brightness pattern to accidentally appear within the search range, a problem occurs that substantially equal minimum values exist within the search range and spots on which the distance measuring cannot be performed appear.

Moreover, a compound-eye distance measuring apparatus, which includes at least three imaging optical systems and has baseline directions, for example, in a vertical direction and a horizontal direction, cannot detect disparities in all regions, because contrast exists in the horizontal direction but contrast does not exist in the vertical direction when the distance measuring is performed on the chart having the lattice pattern as shown in FIG. 17. Thus, when testing the compound-eye distance measuring apparatus having two baseline directions, it is necessary to prepare, for each of the baseline directions, a chart suitable for testing and perform two separate tests.

The objects of the present invention are to solve the above problems, accurately test all the regions within the field of view, and provide a chart, a test method, and a test apparatus which evaluates the accuracy of the distance measured by the compound-eye distance measuring apparatus having two baseline directions by one-time capturing.

Means to Solve the Problems

In order to solve the above problems, a test method for a compound-eye distance measuring apparatus according to the present invention is a test method for evaluating accuracy of a distance measured by a compound-eye distance measuring apparatus which measures a distance to a measurement object based on a disparity in a first baseline direction and a disparity in a second baseline direction that are obtained from at least three imaging optical systems, the first baseline direction and the second baseline direction being different from each other, the test method including: placing a chart on optical axes of the imaging optical systems at a predetermined distance from the imaging optical systems; measuring a distance to the chart by the compound-eye distance measuring apparatus; and calculating a difference between the predetermined distance and the measured distance, and evaluating whether or not the calculated difference is within a predetermined value range, wherein, on the chart, elements in a predetermined geometric pattern are two-dimensionally arranged in a first arrangement direction and a second arrangement direction, the first arrangement direction being tilted by a predetermined angle with respect to the first baseline direction, and the second arrangement direction being tilted by a predetermined angle with respect to the second baseline direction, and in the measuring, the distance to the chart is measured based on displacement of each of imaging positions of elements in a same geometric pattern in each of the baseline directions, the same geometric pattern being formed on each of image sensor planes of a corresponding one of the at least three imaging optical systems.

Here, the "baseline direction" is a direction in which a disparity occurs between two imaging optical systems, that is, an arrangement direction in which the two imaging optical systems are arranged, and in more detail a line connecting imaging centers of the two imaging optical systems (centers of image sensor planes or centers of imaging lenses). Furthermore, the "geometric pattern" is an individual geometric figure included in a pattern formed on a chart, for instance, a circular figure.

Moreover, in the placing, the chart is preferably placed in which an angle of the first arrangement direction with respect to the first baseline direction is set so that a pitch which is a period for repeating, in the first baseline direction, the arrangement of the elements in the geometric pattern on an image formed by each of the imaging optical systems is greater than the disparity in the first baseline direction at the predetermined distance, and in which an angle of the second arrangement direction with respect to the second baseline direction is set so that a pitch which is a period for repeating, in the second baseline direction, the arrangement of the elements in the geometric pattern on the image formed by each of the imaging optical systems is greater than the disparity in the second baseline direction at the predetermined distance.

With the above test method, since it is possible to adjust all calculation blocks by appropriately setting the geometric pattern and an arrangement pitch of the geometric pattern so that contrast always exists in all the calculation blocks and it is possible, in a SAD calculation in each of baseline directions, to cause a pattern of a search block to be always different from that of a standard block in a standard image within an SAD search range, it is possible to accurately obtain distance information of all regions in a field of view.

Moreover, in the placing, the chart is preferably placed where gradations of the elements in the geometric pattern are cyclically changed in the first baseline direction and the second baseline direction. Furthermore, in the placing, the chart is preferably placed where shapes of the elements in the geometric pattern are cyclically changed in the first baseline direction and the second baseline direction. Moreover, in the placing, the chart is preferably placed where sizes of the elements in the geometric pattern are cyclically changed in the first baseline direction and the second baseline direction. Furthermore, in the placing, the chart is preferably placed where orientations of the elements in the geometric pattern are cyclically changed in the first baseline direction and the second baseline direction.

This can increase a difference between the minimum SAD calculation value and second minimum values ahead and behind of the minimum SAD calculation value, and reduce a probability of mistakenly detecting a disparity.

Moreover, the measuring and the calculating and evaluating are preferably repeated for each of blocks obtained by dividing each of the image sensor planes so that contrast exists on the geometric pattern formed on each of the image sensor planes, and the test method preferably further includes determining that the compound-eye distance measuring apparatus passes a test when the number of the blocks for which the difference is evaluated, in the calculating and evaluating, to be within the predetermined value range is equal to or greater than a predetermined number.

This allows the evaluation of the distance measuring accuracy in all the regions of the field of view with any block size, that is, place resolution. In addition, highly accurate testing is made possible by evaluating the distance measuring accuracy of the compound-eye distance measuring apparatus based on a evaluation result of each of blocks.

Furthermore, a chart according to the present invention is a chart for use in the test method for the compound-eye distance measuring apparatus, and, on the chart, elements in a predetermined geometric pattern are two-dimensionally arranged in a first arrangement direction and a second arrangement direction, the first arrangement direction being tilted by a predetermined angle with respect to the first baseline direction, and the second arrangement direction being tilted by a predetermined angle with respect to the second baseline direction.

Moreover, the present invention may be realized as a test apparatus which evaluates accuracy of a distance measured by a compound-eye distance measuring apparatus which measures a distance to a measurement object based on a disparity in a first baseline direction and a disparity in the second baseline direction that are obtained from at least three imaging optical systems, the first baseline direction and the second baseline direction being different from each other, the test apparatus including: a chart placed on optical axes of the imaging optical system at a predetermined distance from the imaging optical systems; a storage unit in which the predetermined distance is stored; a measured distance obtaining unit configured to obtain a distance to the chart measured by the compound-eye distance measuring apparatus; and an evaluation unit configured to evaluate whether or not a difference between the predetermined distance and the measured distance is within a predetermined value range, wherein, on the chart, elements in a predetermined geometric pattern are two-dimensionally arranged in a first arrangement direction and a second arrangement direction, the first arrangement direction is tilted by a predetermined angle with respect to the first baseline direction, and the second arrangement direction is tilted by a predetermined angle with respect to the second baseline direction.

Further, the present invention can be realized as a program causing a computer to execute the calculating and evaluating and the determining or a recording medium such as a computer-readable CD-ROM on which the program is recorded.

Effects of the Invention

The present invention allows accurate testing of all the regions within the field of view and realizes the chart, the test method, and the test apparatus which evaluates the accuracy of the distance measured by the compound-eye distance measuring apparatus having two baseline directions by one-time capturing.

BRIEF DESCRIPTION OF DRAWINGS

FIGS. 1(a) and 1(b) are schematic diagrams showing a chart for distance measuring and a test method according to the present invention.

FIG. 15 is a diagram showing triangulation performed by the compound-eye distance measuring apparatus.

FIG. 16 is a diagram showing a SAD calculation.

FIG. 17 is a diagram showing a chart having a conventional lattice pattern.

Figure 2:
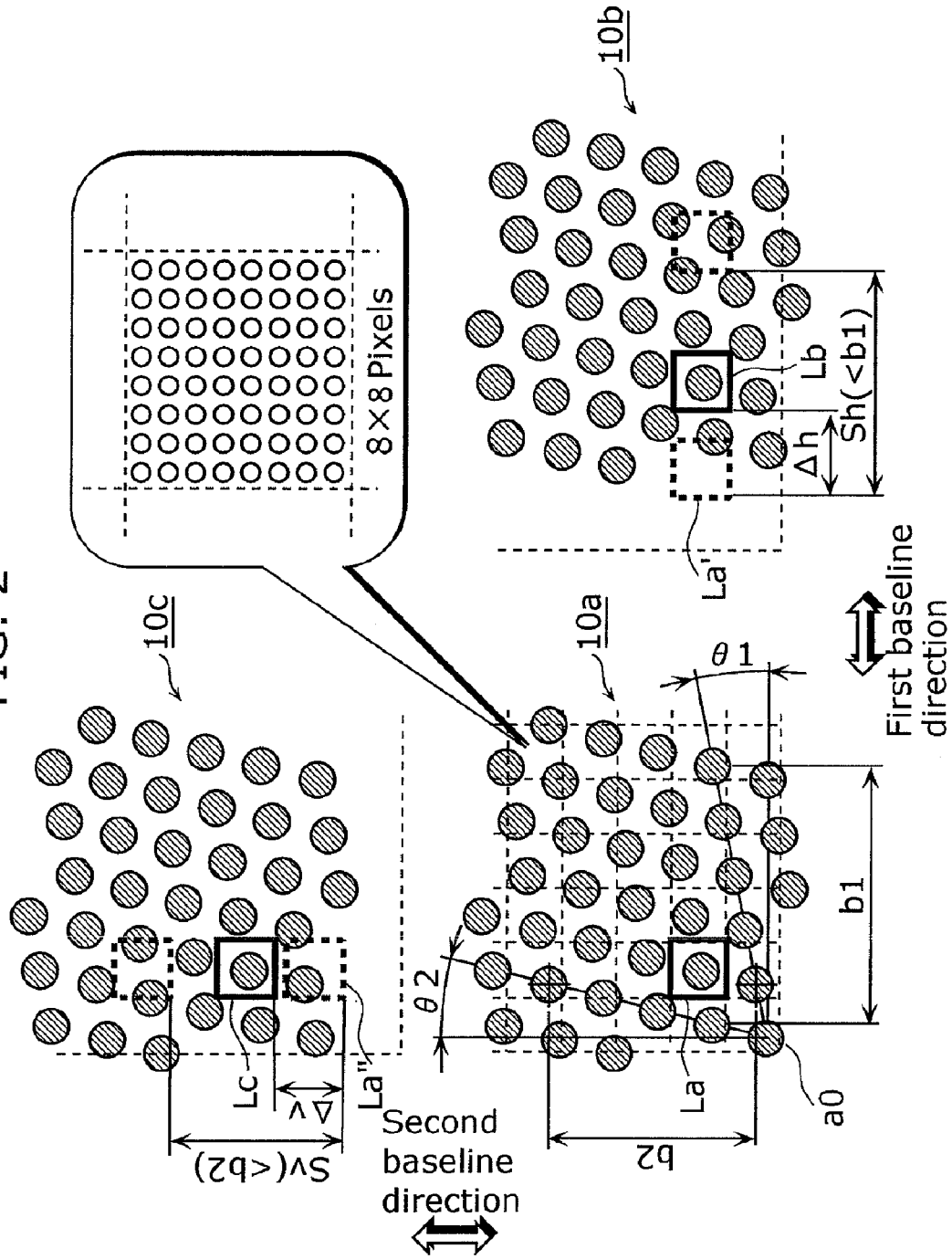
FIG. 2 is a diagram showing a capturing pattern of the chart for distance measuring according to the present invention.

| | Numerical References |
|---|---|
| 1 | Compound-eye distance measuring apparatus |
| 2a | First imaging optical system |
| 2b | Second imaging optical system |
| 2c | Third imaging optical system |
| 3a | First image sensor |
| 3b | Second image sensor |
| 3c | Third image sensor |
| 100 | Test apparatus |
| 101 | Input unit |
| 102 | Display unit |
| 103 | Measured distance obtaining unit |
| 104 | Storage unit |
| 104a | Arrangement distance data |
| 105 | Evaluation unit |
| 110 | Control unit |
| 200 | Compound-eye distance measuring apparatus |
| C1, C2 | Distance measuring chart |
| A0 to A5 | Geometric pattern on distance measuring chart |
| B1 | Pitch of geometric pattern in first baseline direction on chart |
| B2 | Pitch of geometric pattern in second baseline direction on chart |
| P1 to P5 | Geometric pattern formed on image sensor plane |
| θ1α | Angle formed by pattern arrangement direction and first baseline direction |
| θ2β | Angle formed by pattern arrangement direction and second baseline direction |
| La | Calculation block of standard image |
| La' | Calculation block of reference image in first baseline direction |
| La" | Calculation block of reference image in second baseline direction |
| Sh | Search range of SAD calculation in first baseline direction |
| Sv | Search range of SAD calculation in second baseline direction |
| b1 | Pitch of geometric pattern formed on image sensor plane in first baseline direction |
| b2 | Pitch of geometric pattern formed on image sensor plane in second baseline direction |
| Δh | Disparity in first baseline direction |
| Δv | Disparity in second baseline direction |

BEST MODE FOR CARRYING OUT THE INVENTION

The following describes in detail a test chart, a test method, and a test apparatus according to the present invention with reference to the drawings.

Embodiment 1

FIG. 1(a) is a diagram showing a structural example of a chart for evaluating distance measuring (this chart is also called "distance measuring chart" or "test chart") C1 according to Embodiment 1 of the present invention. The chart C1 is, for instance, a sheet-like medium on which a pattern is printed, or an image display monitor on which a pattern is displayed, or a screen on which a pattern is projected by a projector. In FIG. 1(a), as a geometric pattern, circles in a circular pattern A0 are two-dimensionally arranged in array in two (the first and second) arrangement directions. The geometric pattern is not limited to a circular pattern, and may be, for instance, a triangle, rectangle, or polygon pattern. In FIG. 1(a), the first arrangement direction is tilted by θ1 with respect to the first baseline direction (here, a longitudinal direction of the chart C1), and the second arrangement direction is tilted by θ2 with respect to the second baseline direction (here, a latitudinal direction of the chart C1). FIG. 1(b) is a perspective view showing a test method for a compound-eye (namely, stereoscopic) distance measuring apparatus according to the present embodiment. C1 indicates the chart, and the first and second baseline directions shown in FIG. 1(a) are arranged to correspond respectively to the first baseline direction (here, a direction in which a disparity occurs with the first imaging optical system 2a and the second imaging optical system 2b) and the second baseline direction (here, a direction in which a disparity occurs with the first imaging optical system 2a and the third imaging optical system 2c) of a compound-eye distance measuring apparatus 1 including three imaging optical systems shown in FIG. 1(b). The first, second, and third imaging optical systems are indicated by 2a, 2b, and 2c, respectively, and the first, second, and third imaging sensors which respectively correspond to the first, second, and third imaging optical systems are indicated by 3a, 3b, and 3c, respectively. The chart C1 is on an optical axis of each imaging optical system, and is arranged at a position distant from each imaging optical system by a predetermined distance.

In FIG. 1(a), B1 indicates a pitch of the circular pattern in the first baseline direction, that is, a cycle period during which a position of a circle in the circular pattern matches a corresponding position of another circle in the circular pattern when viewed in the first baseline direction, B1 can be changed by changing θ1 with the center of the circular pattern A0 being a rotation center. Moreover, B2 indicates a pitch of the circular pattern in the second baseline direction, that is, a cycle period during which a position of a circle in a circular pattern matches a corresponding position of another circle in the circular pattern when viewed in the second baseline direction, and B2 can be changed by changing θ2 with the center of the circular pattern A0 being the rotation center.

FIG. 2 shows a part of an image 10a outputted by the imaging sensor of the first imaging optical system, a part of an image 10b outputted by the imaging sensor of the second imaging optical system, and a part of an image 10c outputted by the imaging sensor of the third imaging optical system, when the compound-eye distance measuring apparatus 1 shown in FIG. 1(b) captures the chart shown in FIG. 1(a). As the captured pattern is a reverse image when viewed from a side of an object to be captured, the reverse image is reversed and outputted at the time of image output. Thus, the images 10a, 10b, and 10c correspond to the captured pattern viewed from the back side of each image sensor plane. a0 indicates an image which is formed on an image sensor plane and is a circle in a circular pattern corresponding to the pattern A0 on the chart shown in FIG. 1(a), b1 indicates a cycle period in the first baseline direction during which a position of a circle in the circular pattern in a direction perpendicular to the first baseline direction on the image sensor plane matches a corresponding position of another circle in the circular pattern when viewed in the first baseline direction, and b2 indicates a cycle period in the second baseline direction during which a position of a circle in the circular pattern in a direction perpendicular to the second baseline direction on the image sensor plane matches a corresponding position of another circle in the circular pattern when viewed in the second baseline direction. It is to be noted that θ1 and θ2 shown in FIG. 2 each are equal to θ1 and θ2 shown in FIG. 1(a) respectively, because an image pattern is vertically and horizontally reversed with respect to the pattern of the chart and formed, and then reversed and outputted at the time of image output as stated above. Furthermore, each of squares formed by dashed lines on the part of the image pattern 10a shown in FIG. 2 is a block (for example, 8×8 pixels) including pixels, and a SAD calculation is performed on each of the blocks. Properly setting a size and arrangement pitch of the pattern on the chart shown in FIG. 1(a) allows each of calculation blocks of the entire chart image to always have contrast.

Here, in FIG. 2, 10a is a standard image formed by the first imaging optical system, and 10b is a reference image formed by the second imaging optical system. Attention being focused on a standard block (calculation block) La of the standard image 10a, the SAD calculation is performed on La' of the reference image 10b within a search range indicated by Sh. Thus, when a cycle period B1 of the chart shown in FIG. 1(a) is set so that a value of a cycle period b1 becomes greater than the search range Sh of the SAD calculation, only one part of the pattern matches a corresponding part of the pattern within the search range of the SAD calculation. Likewise, attention being focused on the standard block La of the standard image 10a, 10c is a reference image formed by the third imaging optical system, and the SAD calculation is performed on La" of the reference image 10c within a search range indicated by Sv. Thus, when a cycle period B2 of the chart shown in FIG. 1(a) is set so that a value of a cycle period b2 becomes greater than the search range Sv of the SAD calculation, only one part of the pattern matches a corresponding part of the pattern within the search range of the SAD calculation. Therefore, in the present embodiment, on the chart C1, angle θ1 in the first arrangement direction with respect to the first baseline direction is set so that a pitch B1 of a geometric pattern of an image in the first baseline direction becomes larger than a disparity (search range Sh) in the first baseline direction corresponding to a distance (predetermined distance) between the chart C1 and each of the imaging optical systems 2a to 2c, and angle θ2 in the second arrangement direction with respect to the second baseline direction is set so that a pitch B2 of the geometric pattern of the image in the second baseline direction becomes larger than a disparity (search range Sv) in the second baseline direction corresponding to the predetermined distance, the image being formed by each of the imaging optical systems 2a to 2c.

Figure 3:
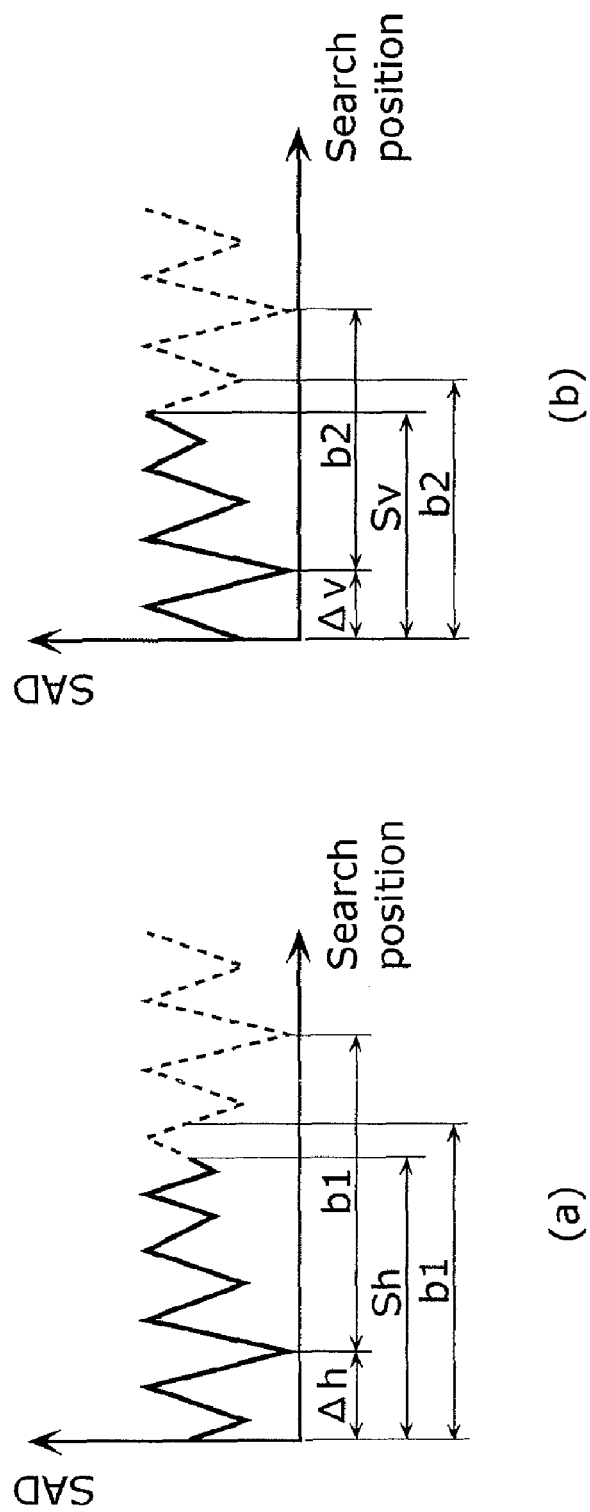
FIGS. 3(a) and 3(b) are diagrams showing a SAD calculation when the chart for distance measuring according to the present invention is used.

Next, the SAD calculation is described. FIG. 3(a) is a graph showing a change in a SAD calculation value of each of the standard image 10a and the reference image 10b shown in FIG. 2. In other words, FIG. 3(a) is a graph showing a relationship between a SAD (calculation result) and a search position (pixel position in the first baseline direction) when a SAD calculation between a target block of the standard image 10a and a block of the reference image 10b is repeated while the block on the reference image 10b is displaced on a pixel-by-pixel basis in the first baseline direction. b1, Sh, and Δh shown in FIG. 3(a) correspond to the numeral references indicated in the reference image 10b shown in FIG. 2, a search position where the SAD calculation value is minimum within the search range Sh has a disparity Δh. Furthermore, minimum SAD calculation values appear within the search range as shown in FIG. 3(a), because the circular pattern of the standard image 10a shown in FIG. 2 is formed while being slightly displaced in a direction perpendicular to the first baseline direction. Moreover, although the minimum SAD calculation value as shown by a dashed line in FIG. 3(a) repeatedly appears with the cycle period b1 when there is no limit to the search range, since the cycle period b1 is set to be greater than the search range Sh, there is only one minimum value within the search range, and a disparity is not mistakenly detected.

Similarly, FIG. 3(b) is a graph showing a change in a SAD calculation value of each of the standard image 10a and the reference image 10c shown in FIG. 2. To put it differently, FIG. 3(b) is a graph showing a relationship between a SAD (calculation result) and a search position (pixel position in the second baseline direction) when a SAD calculation between a target block of the standard image 10a and a block on the reference image 10c is repeated while the block of the reference image 10c is displaced on a pixel-by-pixel basis in the second baseline direction. b2, Sv, and Δv shown in FIG. 3(b) correspond to the numeral references indicated on the reference image 10c shown in FIG. 2, a search position where the SAD calculation value is minimum within the search range Sv has a disparity Δv. Furthermore, minimum SAD calculation values appear within the search range as shown in FIG. 3(b), because the circular pattern of the standard image 10a shown in FIG. 2 is formed while being slightly displaced in a direction perpendicular to the second baseline direction. Moreover, although the minimum SAD calculation value as shown by a dashed line in FIG. 3(b) repeatedly appears with the cycle period b2 when there is no limit to the search range, since the cycle period b2 is set to be greater than the search range Sv, there is only one minimum value within the search range, and a disparity is not mistakenly detected. As stated above, the test method according to the present embodiment makes it possible to highly accurately test the distance accuracy of the compound-eye distance measuring apparatus having the two baseline directions by one-time capturing.

Here, the following describes a method for setting angle θ1 in an arrangement direction of a pattern from the first baseline direction and angle θ2 in an arrangement direction of a pattern from the second baseline direction so that only one part of the pattern matches a corresponding part of the pattern within each of the search range Sh in the first baseline direction and the search range Sv in the second baseline direction of the SAD calculation.

Figure 4:
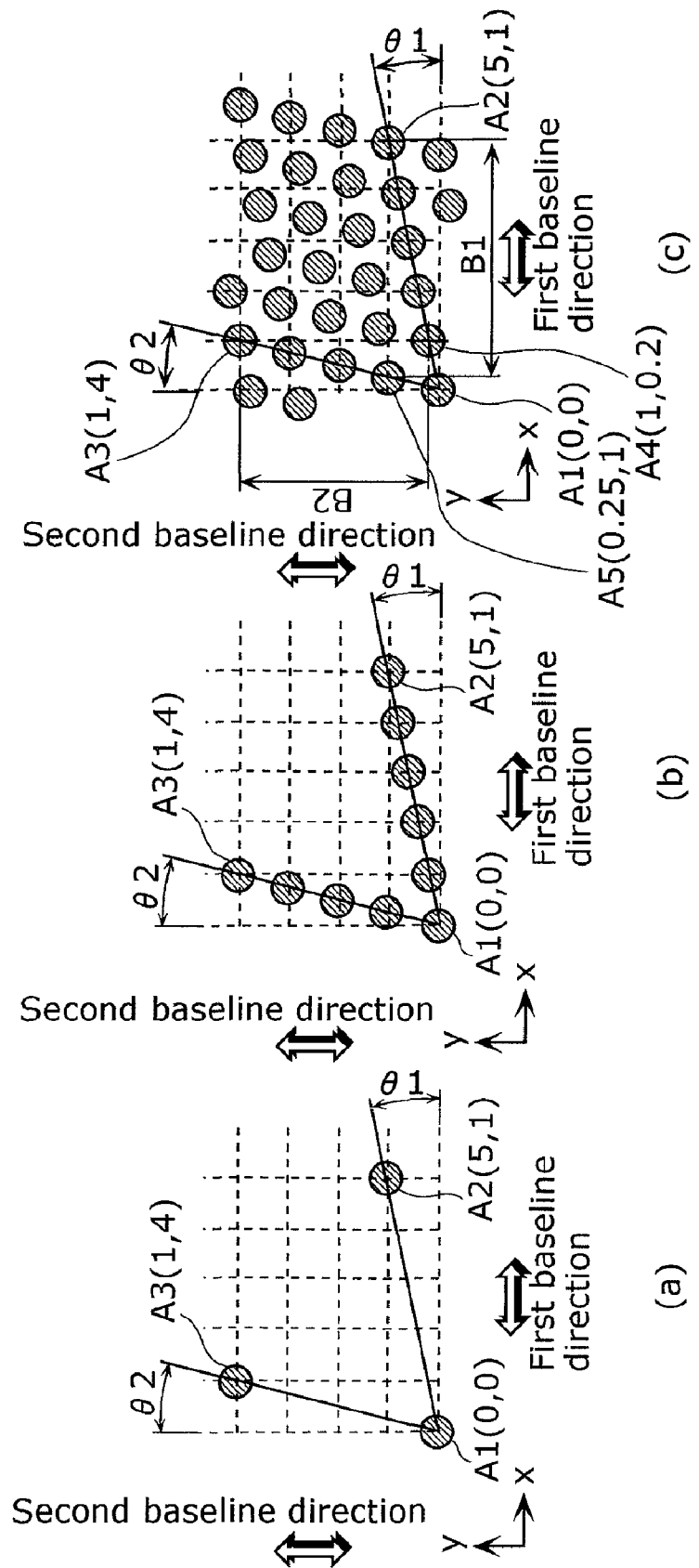
FIGS. 4(a) and 4(b) are schematic diagrams showing a drawing method of the chart for distance measuring according to the present invention.

FIGS. 4(a), 4(b) and 4(c) are diagrams showing a method of drawing a test chart for evaluating distance measuring accuracy of a compound-eye distance measuring apparatus whose ratio of a baseline length between imaging optical systems arranged in the first baseline direction to a baseline length between imaging optical systems arranged in the second baseline direction is 5:4, and whose imaging optical systems each have an equal focal length.

When the ratio of the baseline length between the imaging optical systems arranged in the first baseline direction to the baseline length between the imaging optical systems arranged in the second baseline direction is 5:4, a ratio of the disparity obtained when an object is captured is 5:4 based on Equation 1 regardless of a distance between the imaging optical systems and the test chart. On the other hand, the search range of the SAD calculation needs to include a margin in the disparity range obtained when performing capturing from the longest distance to the shortest distance of the distance measurement object range. Here, when a margin is included, at the same ratio, in each of a disparity search rage Sh between imaging optical systems arranged in the first baseline direction and a disparity search range Sv between imaging optical systems arranged in the second baseline, a ratio of Sh to Sv is also preferably approximately 5:4, and a ratio of the cycle period b1 (b1>Sh) for an image pattern in the first baseline direction on the image sensor plane shown in FIG. 2 to the cycle period b2 (b2>Sv) for an image pattern in the second baseline direction is also further preferably approximately 5:4. Thus, a ratio of the cycle period for the pattern in the first baseline direction to the cycle period for the pattern in the second baseline direction on the chart is also preferably approximately 5:4. In FIGS. 4(a), 4(b) and 4(c), the pattern is drawn on an xy orthogonal coordinate system where the first baseline direction is x direction and the second baseline direction is y direction. In FIGS. 4(a), 4(b) and 4(c), squares formed by dashed lines are virtual lines for drawing. Moreover, the left bottom corner is the origin (0, 0), a size of a square is 1 in both x and y directions, and one square corresponds to a calculation block (for example, 8×8 pixels) in size.

First, as shown in FIG. 4(a), circles A1, A2, and A3 respectively having the origin (0, 0), coordinates (5, 1), and coordinates (1, 4) as the centers of the circles are formed. A condition for size of circle will be described later. Here, an angle formed by the first baseline direction and a line connecting the origin (0, 0) to the coordinates (5, 1) is θ1, and an angle formed by the second baseline direction and a line connecting the origin (0, 0) to the coordinates (1, 4) is θ2. Next, as shown in FIG. 4(b), a circle is formed at each of points where the line connecting the origin (0, 0) to the coordinates (5, 1) is divided into five equal parts, and a circle is formed at each of points where the line connecting the origin (0, 0) to the coordinates (1, 4) is divided into four equal parts. Finally, as shown in FIG. 4(c), circles are arranged in array in arrangement directions that are a direction of the line connecting the origin (0, 0) to the coordinates (5, 1) and a direction of the line connecting the origin (0, 0) to the coordinates (1, 4), so as to form a circular pattern. Here, a circle A5 having coordinates (0.25, 1) as the center thereof and the circle A2 having the coordinates (5, 1) as the center thereof form the cycle period B1 (=4.75) during which a y component of the circle A5 matches a corresponding y component of the circle A2 when viewed from the first baseline direction, a circle A4 having coordinates (1, 0.2) as the center thereof and the circle A3 having the coordinates (1, 4) as the center thereof form the cycle period B2 (=3.8) during which an x component of the circle A4 matches a corresponding y component of the circle A3 when viewed from the second baseline direction, and the ratio of the period B1 to the period B2 is 5:4.

In the present embodiment, since a circle completely occupies a circumscribed circle of a triangle having the origin (0, 0), the coordinates (0.25, 1), and the coordinates (1, 0.2) as vertices when the size of circle is set greater than that of the circumscribed circle, it is necessary to set the size of circle smaller than that of the circumscribed circle. In the present embodiment, the radius of the circle is half of that of the circumscribed circle.

When the compound-eye distance measuring apparatus captures such a chart, the image shown in FIG. 2 is formed on the image sensor plane and the same pattern is not repeated within the search range in either the first baseline direction or the second baseline direction. Thus, there is only one minimum value within the search range in the SAD calculation, and a disparity is not mistakenly detected.

It is to be noted that although the coordinates of the circle A2 are (5, 1) and the coordinates of the circle A3 are (1, 4) in the present embodiment, the coordinates of the circle A2 may be (10, 1) and the coordinates of the circle A3 may be (1, 8)

when a compound-eye distance measuring apparatus has a greater amount of search disparity. In this case, a ratio of the cycle period b1 for image pattern in the first baseline direction to the cycle period b2 for image pattern in the second baseline direction is also 5:4. Generally, in drawing a test chart for evaluating distance measuring accuracy of a compound-eye distance measuring apparatus whose ratio of a baseline length of imaging optical systems arranged in the first baseline direction to a baseline length of imaging optical systems arranged in the second baseline direction is m:n, when a is an integer, the coordinates of the circle A2 may be (m·a, 1) and the coordinates of the circle A3 may be (1, n·a). However, when the values of m and n are large numbers, the values may be approximated to a ratio with a small value. For example, when a ratio is m:n=51:37, it is permissible to approximate the ratio to m=5 and n=4 at the time of drawing.

Figure 5:
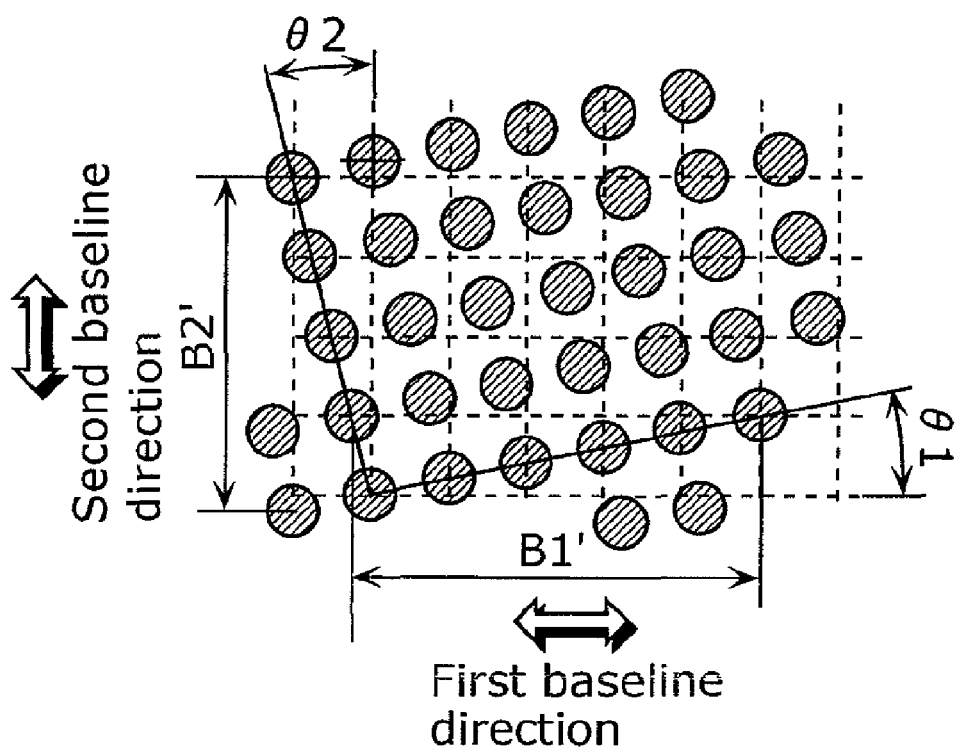
FIG. 5 is a schematic diagram showing the chart for distance measuring according to the present invention.

It is to be noted that although θ2 defines the arrangement direction of the circular pattern in a clockwise direction with respect to the second baseline direction in FIG. 4(a) to (c), θ2 may define the arrangement direction of the circular pattern in a counterclockwise direction with respect to the second baseline direction as shown in FIG. 5. Here, a ratio of a cycle period B1' during which an x component of a circle matches a corresponding x component of the circle when viewed from the first baseline direction to a cycle period B2' during which a y component of a circle matches a corresponding y component of the circle when viewed from the second baseline direction is also 5:4.

Figure 6:
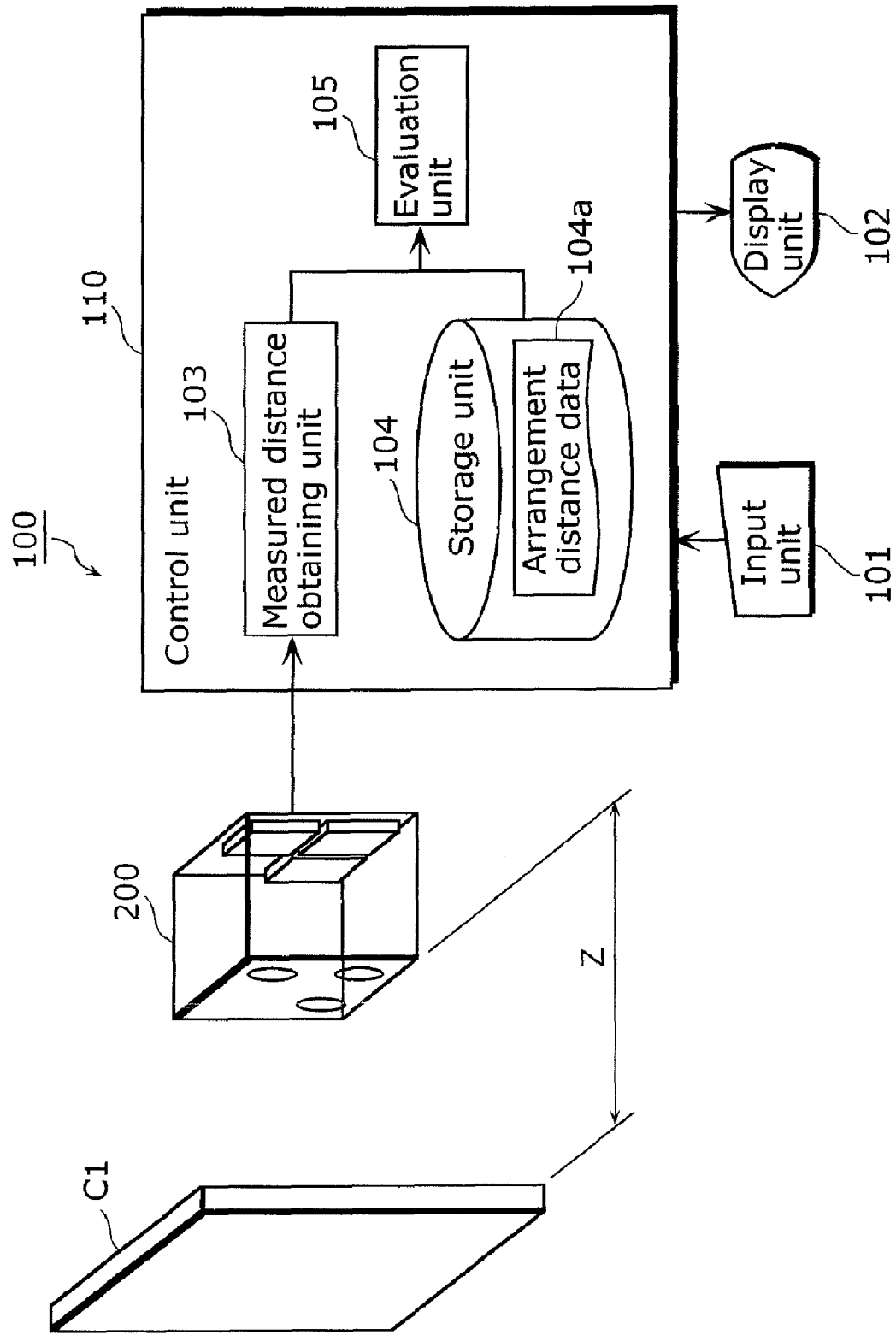
FIG. 6 is a block diagram showing a functional structure of a test apparatus according to the present invention.

FIG. 6 is a block diagram showing an example of a functional structure of a test apparatus 100 according to the present embodiment. Here, a compound-eye distance measuring apparatus 200 to be tested is also shown. The test apparatus 100 is an apparatus which tests distance accuracy of the compound-eye distance measuring apparatus 200, and includes a chart C1, an input unit 101, a display unit 102, and a control unit 110 (a measured distance obtaining unit 103, a storage unit 104, and an evaluation unit 105). The compound-eye distance measuring apparatus 200 is an apparatus which has the first baseline direction and the second baseline direction and measures a distance to a measurement object with a disparity in the first baseline direction and a disparity in the second baseline direction which are obtained from at least three imaging optical systems, the first baseline direction and the second baseline direction being different from each other.

The chart C1 is characterized by a pattern as stated above, and is, for instance, a sheet-like medium on which a pattern is printed, or an image display monitor on which a pattern is displayed, or a screen on which a pattern is projected by a projector. The chart C1 is arranged on optical axes of the three imaging optical systems included by the compound-eye distance measuring apparatus 200 at a predetermined distance (for example, 50 cm) from these imaging optical systems.

The input unit 101 includes, for instance, a keyboard and a mouse, receives an operation from an operator, and notifies a result of the operation to the control unit 110 and so on.

The display unit 102 includes, for example, a liquid-crystal display, and displays data stored in the storage unit 104, a result of the test, and so on.

The control unit 110 is connected to the compound-eye distance measuring apparatus 200, the input unit 101, and the display unit 102, a processing unit which tests the compound-eye distance measuring apparatus 200 by controlling them and exchanging signals with them, and includes the measured distance obtaining unit 103, the storage unit 104, and the evaluation unit 105. The control unit 110 is realized by, for instance, a CPU (Central Processing Unit), a RAM (Random Access Memory), a ROM (Read Only Memory) on which a control program is stored, a communication interface, and an auxiliary memory (nonvolatile memory such as a hard disk).

The measured distance obtaining unit 103 obtains a distance (measured distance) to a calculation block measured by the compound-eye distance measuring apparatus 200 or a chart for each of pixels.

The storage unit 104 includes a readable and writable memory and the like, and stores arrangement distance data 104a indicating a distance (predetermined distance) between the three imaging optical systems included by the compound-eye distance measuring apparatus 200 and the chart C1.

The evaluation unit 105 is a processing unit which calculates a difference between the distance (predetermined distance) indicated by the arrangement distance data 104a and the distance (measured distance), and evaluates whether or not the calculated difference is within a predetermined value range.

The following describes the test method for the compound-eye distance measuring apparatus 200 using the test apparatus 100 structured as above in the present embodiment. Here, the test method is a method for evaluating accuracy of a distance measured by the compound-eye distance measuring apparatus 200 which has the first baseline direction and the second baseline direction and measures a distance to a measurement object with a disparity in the first baseline direction and a disparity in the second baseline direction which are obtained from at least three imaging optical systems, the first baseline direction and the second baseline direction being different from each other.

The test method includes steps as indicated below.
(1) Placing the chart C1 on an optical axis of an imaging optical system at a predetermined distance from the imaging optical system (here, the compound-eye distance measuring apparatus 200), the placing being performed, for example, with a human hand or by a robot
(2) Measuring a distance to the chart C1 by the compound-eye distance measuring apparatus 200
(3) Calculating a difference between a predetermined distance and the measured distance, and evaluating whether or not the calculated difference is within a predetermined value range It is to be noted that the measuring and the calculating and evaluating are repeated for each of blocks obtained by diving an image sensor plane so that contrast exists in a geometric pattern formed on the image sensor plane.
(4) Determining that the compound-eye distance measuring apparatus 200 passes the test when the number of blocks for which the difference is evaluated to be within the predetermined value range in the calculating and evaluating is greater than a predetermined number What is unique here is that a predetermined geometric pattern is two-dimensionally arranged in the first arrangement direction and the second arrangement direction and each of the first and second arrangement directions is tilted by a predetermined angle with respect to the first baseline direction and the second baseline direction on the chart C1, and is further that in the measuring, the distance to the chart is measured based on displacement of each of imaging positions of the same geometric patterns in each baseline direction, the same geometric patterns being formed on the image sensor planes of the at least three imaging optical systems.

Next, the basic operation of the test apparatus 100 according to the present embodiment is described.

Figure 7:
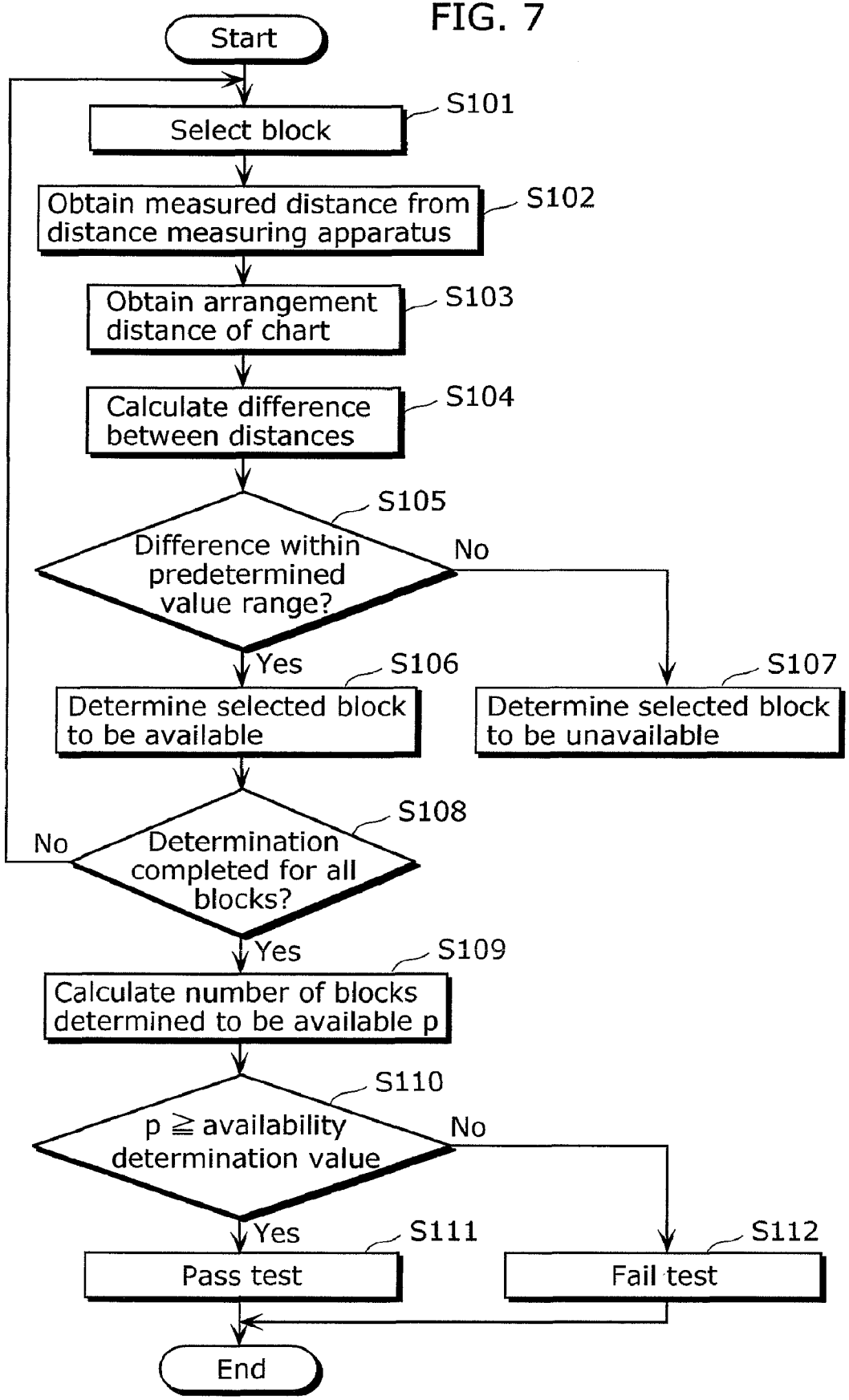
FIG. 7 is a flow chart showing a procedure of evaluating distance measuring accuracy of a compound-eye distance measuring apparatus by the test apparatus.

FIG. 7 is a flow chart showing a procedure (that is, the measuring, the calculating and evaluating, and the determining) for evaluating accuracy in measuring a distance which extracted from each imaging optical system of the compound-eye distance measuring apparatus 200, the procedure being subsequent to the above placing and performed by the test apparatus 100. It is to be noted that the test apparatus 100 performs the evaluation in the same manner in each of two baseline directions. Here, a procedure for performing the evaluation in one baseline direction.

First, the measured distance obtaining unit 103 receives a standard image and a reference image from the compound-eye distance measuring apparatus 200, and selects, for each of the images, a calculation block on which a test to be subsequently performed has not been performed (S101). Next, the measured distance obtaining unit 103 extracts a disparity through a SAD calculation performed on the selected calculation block, and obtains the measured distance by converting the disparity into a measured distance with the above Equation 2 (S102). The steps S102 to S103 correspond to the above measuring.

It is to be noted that when the compound-eye distance measuring apparatus 200 has a function to calculate a measured distance for each of calculation blocks, the measured distance obtaining unit 103 may obtain the measured distance calculated by the compound-eye distance measuring apparatus 200.

Furthermore, the extraction of the disparity through the SAD calculation is performed by specifying a difference (the number of pixels in a baseline direction) between a position of a calculation block in the standard image and a corresponding position of a calculation block in the reference image where a SAD calculation value is minimum. Here, accuracy used in the extraction of the disparity may be a pixel unit or a sub-pixel unit. It is only necessary to cause SAD calculation values including the minimum SAD calculation value to fit to an approximate curve on the graph of the SAD calculation value shown in FIG. 3, and to determine a search position (a pixel position in a baseline direction) at the lowest point on the curve, so as to extract a disparity with the sub-pixel unit.

Subsequently, the evaluation unit 105 obtains, from arrangement distance data 104a stored in the storage unit 104, an arrangement distance from the compound-eye distance measuring apparatus 200 to the chart C1, the arrangement distance corresponding to the selected calculation block (S103).

Then, the evaluation unit 105 calculates a difference between the measured distance obtained in Step S102 and the arrangement distance obtained in Step S103 (S104). Next, the evaluation unit 105 determines whether or not the calculated difference is within a predetermined value range, for instance, within plus or minus 5% of a range in regard to a distance Z (S105). Here, when the calculated difference is within the predetermined value range (Yes in S105), the evaluation unit 105 determines that the selected calculation block is available (S106). On the other hand, when the calculated difference is not within the predetermined value range (No in S105), the evaluation unit 105 determines that the selected calculation block is unavailable (S107). The steps S104 to S107 correspond to the above evaluating.

Subsequently, the evaluation unit 105 determines whether or not the above determination has been completed for all calculation blocks (S108). Here, when the evaluation unit 105 determines that the determination has not been completed for all the calculation blocks (No in S108), the flow returns to Step S101 again, and the calculation block selecting process is repeated. On the other hand, when the evaluation unit 105 determines that the determination has been completed for all the calculation blocks (Yes in S108), the evaluation unit 105 calculates the number of calculation blocks (the number of blocks determined to be available) p determined to be available in step S106 (S109). Here, when the calculated number of blocks determined to be available p is equal to or greater than an availability determination value that is a predetermined value, for instance, equal to or greater than 95% of the number of all calculation blocks to be evaluated (Yes in S110), the evaluation unit 105 determines that the compound-eye distance measuring apparatus 200 to be tested passes the test (S111) and finishes the process. On the other hand, when the calculated number of blocks determined to be available p is below the availability determination value that is the predetermined value (No in S110), the evaluation unit 105 determines that the compound-eye distance measuring apparatus 200 to be tested does not pass the test (S112), and finishes the process. The steps S109 to S112 correspond to the above determining.

It is to be noted that the test apparatus 100 performs, through the above procedure, the test in each of the two baseline directions, and determines a result of the test for each of the two baseline directions. Alternatively, only when it is determined that the tests in both of the two baseline directions are passed, the test apparatus 100 determines that the test is passed as a comprehensive determination.

It is possible to obtain, for each calculation block, distance information in all regions within the field of view through the above procedure. In addition, it is possible to highly accurately test the distance measuring accuracy of the compound-eye distance measuring apparatus through evaluation of a difference between the obtained distance information and actual distance information.

Embodiment 2

The following describes a test chart according to Embodiment 2 of the present invention.

Figure 8:
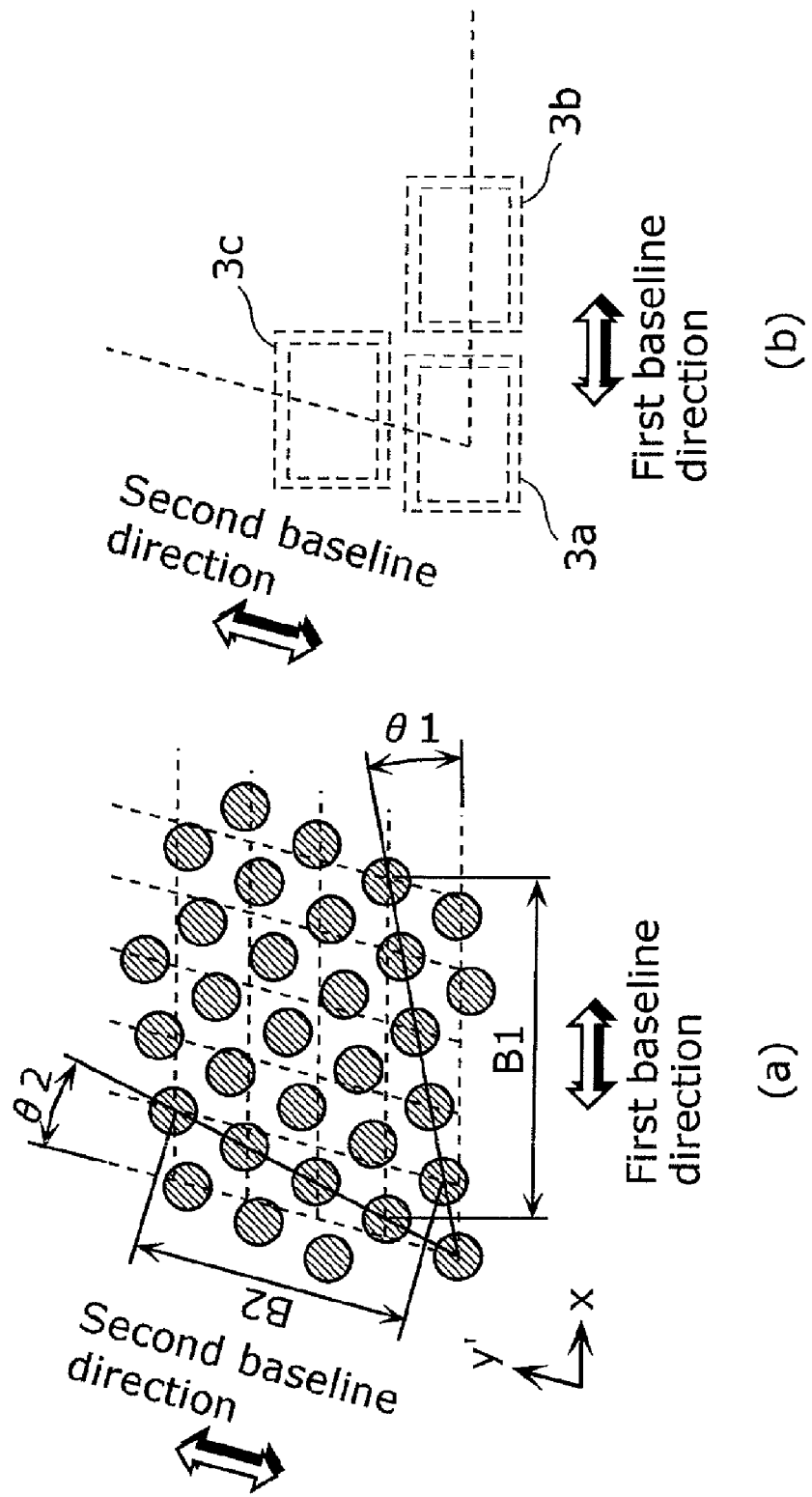
FIGS. 8(a) and 8(b) are schematic diagrams showing the chart for distance measuring according to the present invention.

FIG. 8(a) shows a part of a pattern of the test chart for a compound-eye distance measuring apparatus whose first baseline direction is not perpendicular to the second baseline direction as shown in FIG. 8(b). In FIG. 8(a), the pattern is drawn on an xy' orthogonal coordinate system where the first baseline direction is x direction and the second baseline direction is y' direction. In FIG. 8(a), squares formed by dashed lines are virtual lines for drawing. Moreover, the left bottom corner is the origin (0, 0), a size of a square is 1 in both x and y' directions. FIG. 8(a) of the present embodiment merely differs from FIG. 4 in the second baseline direction, and the same drawing method is used for both FIG. 8(a) and FIG. 4.

Since each of pixels of an imaging sensor is normally arranged in perpendicular, when a disparity in the second baseline direction is searched, it is desirable to perform a disparity calculation after performing a process of rotating an image to cause the second baseline direction to be perpendicular to the first baseline direction.

When the compound-eye distance measuring apparatus whose first baseline direction is not perpendicular to the second baseline direction as shown in FIG. 8(b) captures such a chart, there is only one minimum value within a search range in each of the first baseline direction and the second baseline direction, and a disparity is not mistakenly detected.

Embodiment 3

The following describes a test chart according to Embodiment 3 of the present invention.

Figure 9:
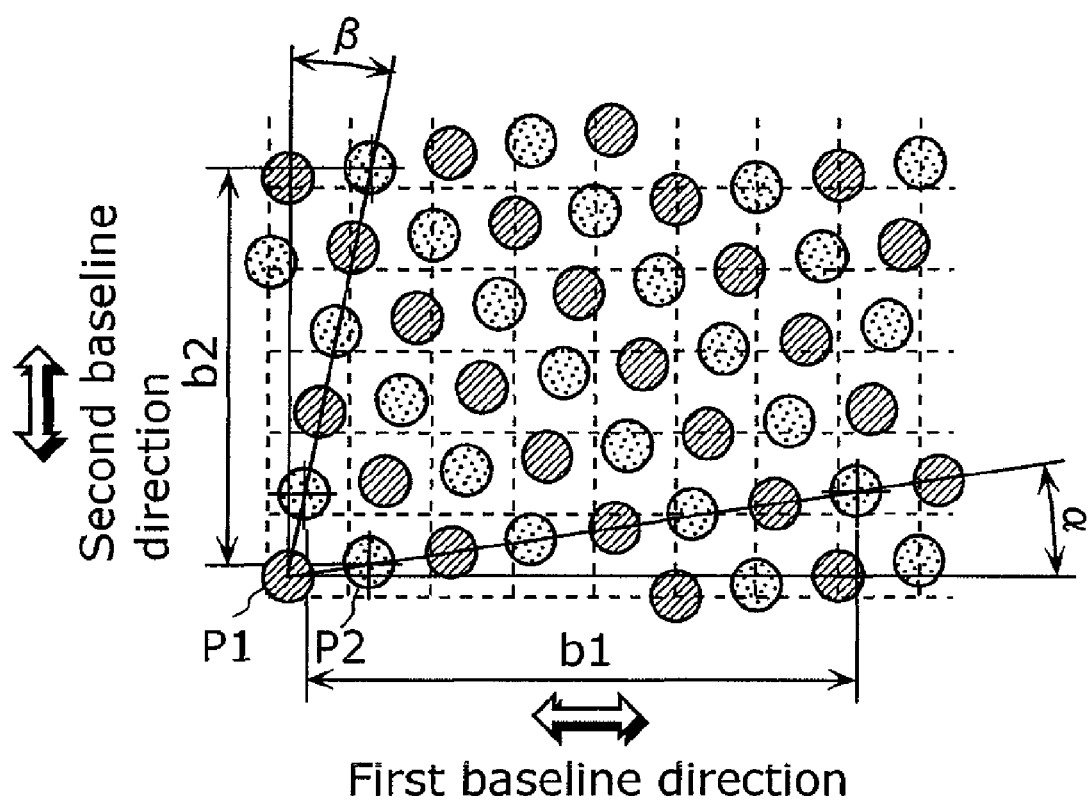
FIG. 9 is a diagram showing a capturing pattern of a chart for distance measuring according to the present invention.

FIG. 9 shows a part of an image pattern formed on an image sensor plane of the first imaging optical system when gradations (shading, hue, brightness, saturation, and so on) of elements in a geometric pattern on a chart is cyclically changed in the first baseline direction and the second baseline direction. In FIG. 9, P1 and P2 each are a circle having a different gradation, the first pattern arrangement direction is tilted by α with respect to the first baseline direction, and the second pattern arrangement direction is tilted by β with respect to the second baseline direction. Although the gradations of the circles are alternately repeated as two types in FIG. 9, more than three gradations may be cyclically changed. When a disparity obtained at the shortest distance of a distance measuring range is large, an angle formed by a pattern arrangement direction and a baseline direction needs narrowing, and the circles arranged in array as in Embodiment 1 have the same gradation, a difference between the minimum SAD calculation value and adjacent second minimum SAD values is small, and there is a possibility of mistakenly detecting a disparity.

Figure 10:
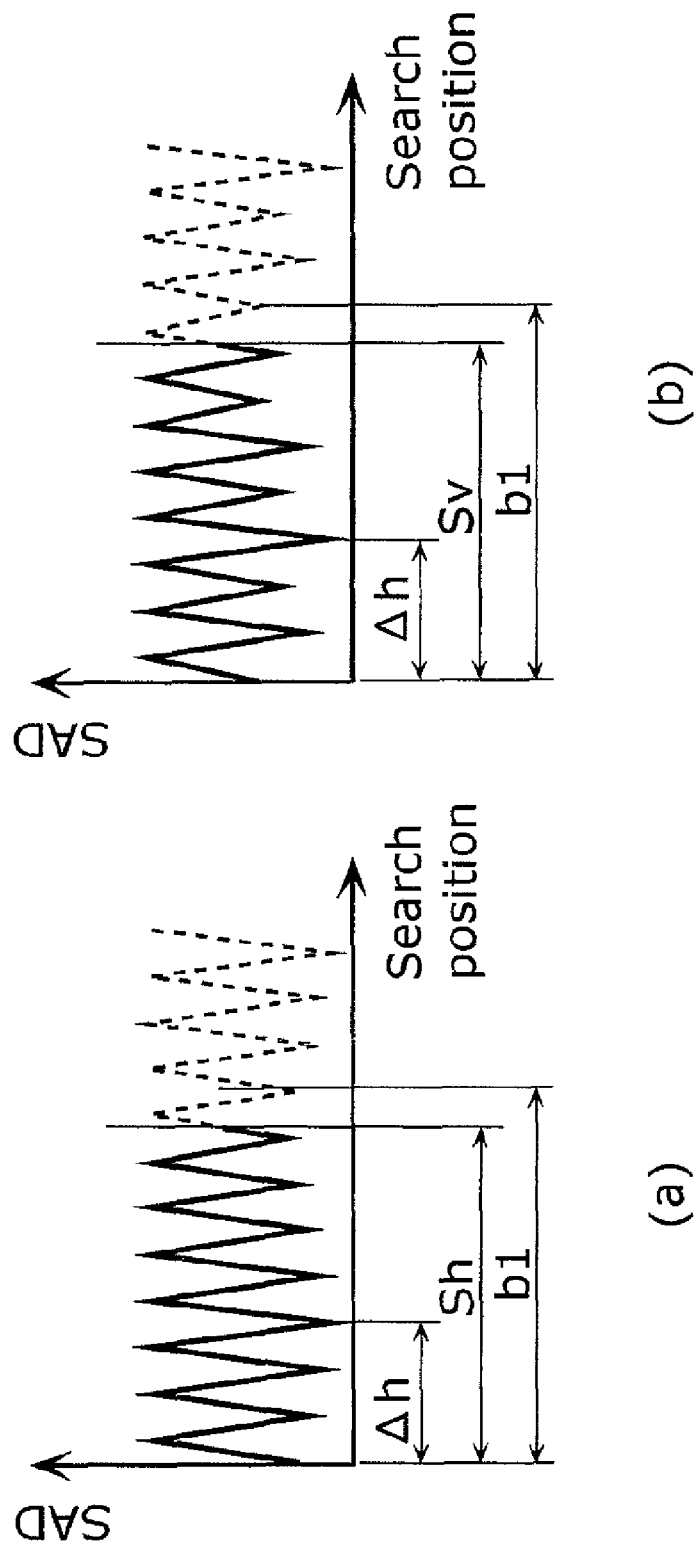
FIGS. 10(a) and 10(b) are diagrams showing a SAD calculation when the chart for distance measuring according to the present invention is used.

FIG. 10(a) and (b) is a diagram showing a SAD calculation when an angle formed by a pattern arrangement direction and a baseline direction is small. Δh indicates a disparity, Sh indicates a search range of the SAD calculation, and b1 indicates a cycle period in a baseline direction during which a position of a circle in a circular pattern in a direction perpendicular to the baseline direction on an image sensor plane matches a corresponding position of another circle in the circular pattern when viewed in the baseline direction. FIG. 10(a) is a diagram showing a SAD calculation when the pattern is arranged with the same gradation, and FIG. 10(b) shows a SAD calculation when the pattern is alternately arranged with two gradations as in the present embodiment (FIG. 9). A SAD calculation value can cause a difference between adjacent second minimum values to be increased by alternately repeating, in the baseline direction, an arrangement direction of the pattern having two different gradations. Thus, the difference between the minimum value and the adjacent second minimum values ahead and behind of the minimum value can be increased in comparison with FIG. 10(a), and the possibility of mistakenly detecting the disparity can be decreased.

It is to be noted that although only one minimum SAD calculation value can be obtained within a search range on a chart where only gradation of a pattern is cyclically changed with tilt α and tilt β being 0, since tilting the arrangement of the pattern allows the difference between the minimum value and the adjacent second minimum values to be increased and the possibility of mistakenly detecting the disparity can be decreased, it is desirable to tilt the arrangement of the pattern.

Embodiment 4

The following describes a test chart according to Embodiment 4 of the present invention.

Figure 11:
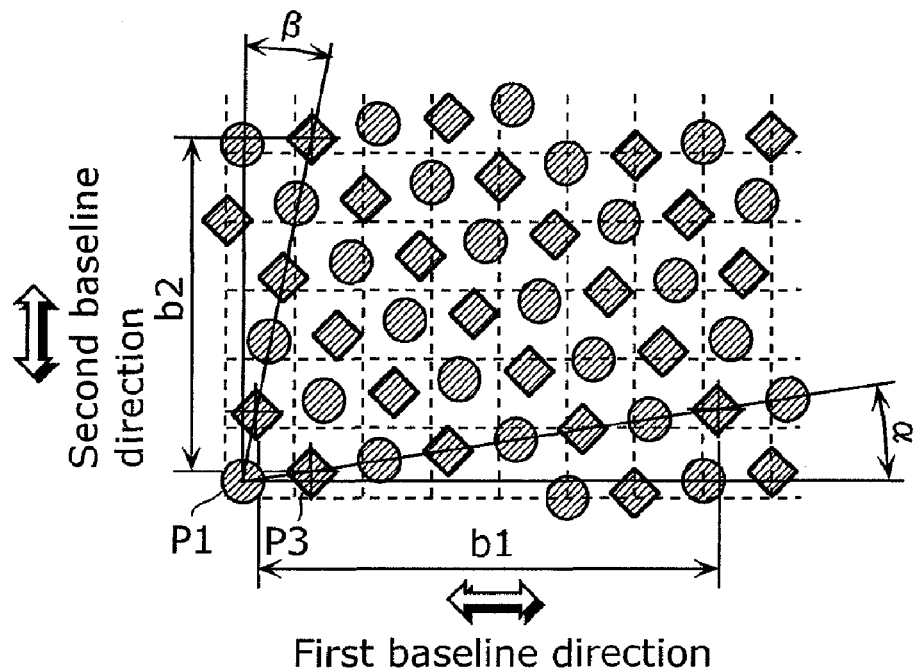
FIG. 11 is a diagram showing a capturing pattern of a chart for distance measuring according to the present invention.

FIG. 11 shows a part of an image pattern formed on an image sensor plane of the first imaging optical system when shapes of elements in a geometric pattern on a chart are cyclically changed in the first baseline direction and the second baseline direction. In FIG. 11, P1 and P3 each are an element having a different shape, the first pattern arrangement direction is tilted by α with respect to the first baseline direction, and the second pattern arrangement direction is tilted by β with respect to the second baseline direction. Although a circle and a square are alternately repeated on the chart in FIG. 11, more than 3 shapes of elements may be cyclically changed. As with Embodiment 3, in the present embodiment, when an angle formed by a pattern arrangement direction and a baseline direction is small, a difference between the minimum SAD calculation value and adjacent second minimum values ahead and behind of the minimum SAD calculation value can be increased, and a possibility of mistakenly detecting a disparity can be decreased.

It is to be noted that although only one minimum SAD calculation value can be obtained within a search range on a chart where only shapes of elements in a pattern are cyclically changed with tilt α and tilt β being 0, since tilting the arrangement of the pattern allows the difference between the minimum value and the adjacent second minimum values to be increased and the possibility of mistakenly detecting the disparity can be decreased, it is desirable to tilt the arrangement of the pattern.

Embodiment 5

The following describes a test chart according to Embodiment 5 of the present invention.

Figure 12:
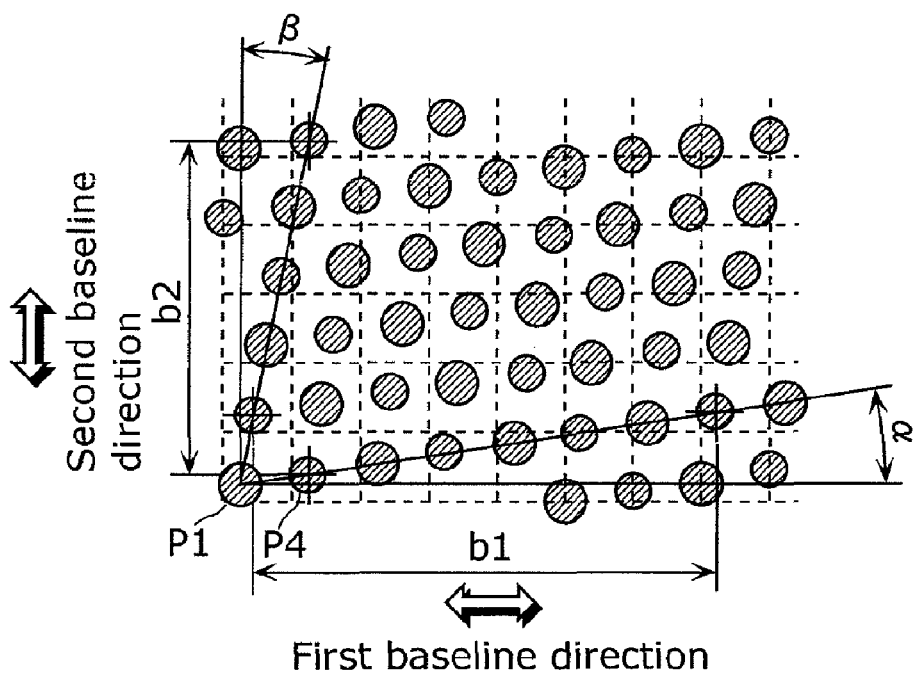
FIG. 12 is a diagram showing a capturing pattern of a chart for distance measuring according to the present invention.

FIG. 12 shows a part of an image pattern formed on an image sensor plane of the first imaging optical system when sizes of elements in a geometric pattern on a chart are cyclically changed in the first baseline direction and the second baseline direction. In FIG. 12, P1 and P4 each are a circle having a different size, the first pattern arrangement direction is tilted by α with respect to the first baseline direction, and the second pattern arrangement direction is tilted by β with respect to the second baseline direction. Although two sizes of circles are alternately repeated on the chart in FIG. 12, more than three sizes of circles may be cyclically changed. As with Embodiment 3, in the present embodiment, when an angle formed by a pattern arrangement direction and a baseline direction is small, a difference between the minimum SAD calculation value and adjacent second minimum values ahead and behind of the minimum SAD calculation value can be increased, and a possibility of mistakenly detecting a disparity can be decreased.

It is to be noted that although only one minimum SAD calculation value can be obtained within a search range on a chart where only sizes of elements in a pattern are cyclically changed with tilt α and tilt β being 0, since tilting the arrangement of the pattern allows the difference between the minimum value and the adjacent second minimum values to be increased and the possibility of mistakenly detecting the disparity can be decreased, it is desirable to tilt the arrangement of the pattern.

Embodiment 6

The following describes a test chart according to Embodiment 6 of the present invention.

Figure 13:
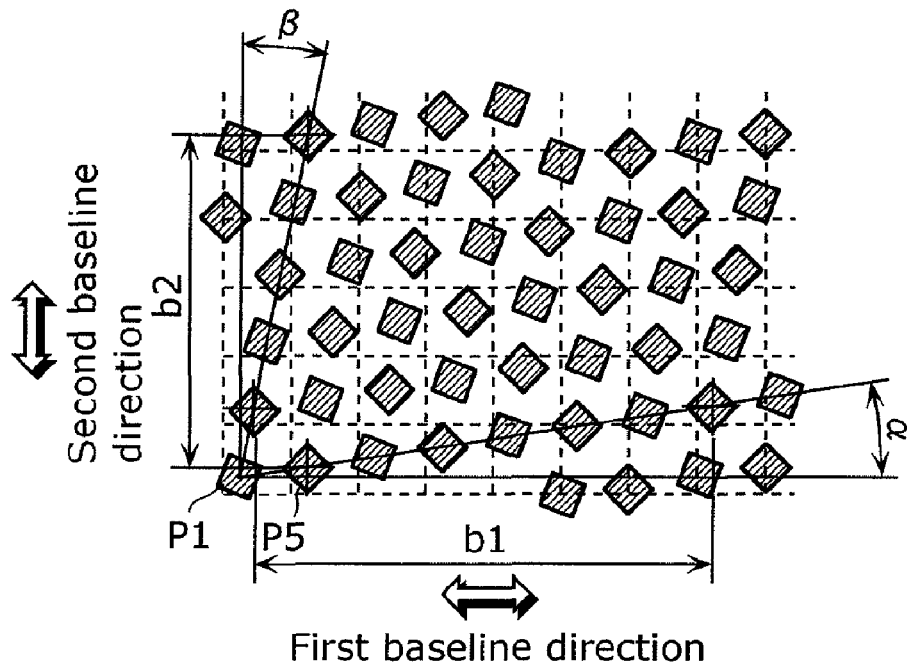
FIG. 13 is a diagram showing a capturing pattern of a chart for distance measuring according to the present invention.

FIG. 13 shows a part of an image pattern formed on an image sensor plane of the first imaging optical system when orientations of elements in a geometric pattern (here, the elements being squares, an angle of rotation of a square) on a chart are cyclically changed in the first baseline direction and the second baseline direction. In FIG. 13, P1 and P5 each are an element having a different orientation, the first pattern arrangement direction is tilted by α with respect to the first baseline direction, and the second pattern arrangement direction is tilted by β with respect to the second baseline direction. Although two orientations of the squares are alternately repeated on the chart in FIG. 13, more than three orientations of the squares may be cyclically changed. As with Embodiment 3, in the present embodiment, when an angle formed by a pattern arrangement direction and a baseline direction is small, a difference between the minimum SAD calculation value and adjacent second minimum values ahead and behind of the minimum SAD calculation value can be increased, and a possibility of mistakenly detecting a disparity can be decreased.

It is to be noted that although only one minimum SAD calculation value can be obtained within a search range on a chart where only orientations of elements in a pattern are cyclically changed with tilt α and tilt β being 0, since tilting the arrangement of the pattern allows the difference between the minimum value and the adjacent second minimum values to be increased and the possibility of mistakenly detecting the disparity can be decreased, it is desirable to tilt the arrangement of the pattern.

As described above, distance information of all regions within the field of view can be obtained with any block size by employing the test method according to Embodiments 1 to 6. Thus, it is possible to perform a test in which quality standards are set for each of regions or a test in which quality standards are set for distribution of obtained data.

Moreover, since a disparity can be extracted from imaging optical systems arranged in the first baseline direction and imaging optical systems arranged in the second baseline direction, by using an image obtained by one-time capturing, it is not necessary to change an orientation of a chart or a compound-eye distance measuring apparatus for each of baseline directions.

Although the test chart, the test method, and the test apparatus according to the present invention have been described based on Embodiments 1 to 6, the present invention is not limited to these embodiments. The present invention includes modifications obtained by modifying each embodiment within the scope of the present invention and modifications obtained by appropriately combining the features of each modification.

Figure 14:
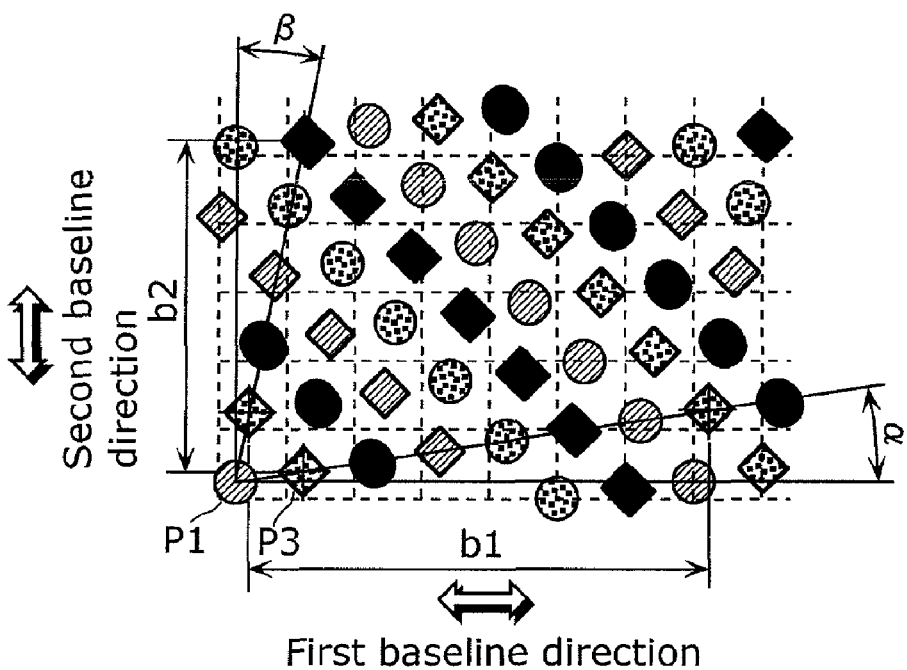
FIG. 14 is a diagram showing a capturing pattern of a chart for distance measuring according to the present invention.

For example, although only one of the gradations, shapes, sizes, and orientations of the elements in the geometric pattern is cyclically changed in the first baseline direction and the second baseline direction in Embodiments 3 to 6, the test chart according to the present invention may not be limited to such an arrangement of the elements in the geometric pattern and at least two of the gradations, shapes, sizes, and orientations may be cyclically changed in the first baseline direction and the second baseline direction. Here, as in the image pattern shown in FIG. 14, one of gradations, shapes, sizes, and orientations of elements in a geometric pattern is cyclically changed in n ($\geqq 2$) steps in the first baseline direction and the second baseline direction, an other one of the gradations, shapes, sizes, and orientations of the elements in the geometric pattern is cyclically changed in m ($\geqq 2$) steps in the first baseline direction and the second baseline direction, and n and m may be different values. The gradations of the elements in the geometric pattern are changed in three steps and at the same time the shapes of the elements in the geometric pattern are changed in two steps on the chart shown in FIG. 14. With this, a difference between the minimum SAD calculation value and adjacent second minimum values ahead and behind of the minimum SAD calculation value can be increased more than a case where only one of the gradations, shapes, sizes, and orientations of the elements in the geometric pattern is changed, and a possibility of mistakenly detecting a disparity can be further decreased.

INDUSTRIAL APPLICABILITY

The test method for compound-eye distance measuring apparatus according to the present invention is applicable to test distance measuring accuracy of in-vehicle compound-eye distance measuring apparatuses, compound-eye distance measuring apparatuses for monitoring camera, compound-eye distance measuring apparatuses for three-dimensional shape measuring system, and so on.

The invention claimed is:

1. A test method for evaluating accuracy of a distance measured by a compound-eye distance measuring apparatus which measures a distance to a measurement object based on a disparity in a first baseline direction and a disparity in a second baseline direction that are obtained from at least three imaging optical systems, the first baseline direction and the second baseline direction being different from each other, said test method comprising:

placing a chart on optical axes of the imaging optical systems at a predetermined distance from the imaging optical systems;

measuring a distance to the chart by the compound-eye distance measuring apparatus; and calculating a difference between the predetermined distance and the measured distance, and evaluating whether or not the calculated difference is within a predetermined value range, wherein, on the chart, elements in a predetermined geometric pattern are two-dimensionally arranged in a first arrangement direction and a second arrangement direction, the first arrangement direction being tilted by a predetermined angle with respect to the first baseline direction, and the second arrangement direction being tilted by a predetermined angle with respect to the second baseline direction, and in said measuring, the distance to the chart is measured based on displacement of each of imaging positions of elements in a same geometric pattern in each of the baseline directions, the same geometric pattern being formed on each of image sensor planes of a corresponding one of the at least three imaging optical systems.

2. The test method according to claim 1, wherein, in said placing, the chart is placed in which an angle of the first arrangement direction with respect to the first baseline direction is set so that a pitch which is a period for repeating, in the first baseline direction, the arrangement of the elements in the geometric pattern on an image formed by each of the imaging optical systems is greater than the disparity in the first baseline direction at the predetermined distance, and in which an angle of the second arrangement direction with respect to the second baseline direction is set so that a pitch which is a period for repeating, in the second baseline direction, the arrangement of the elements in the geometric pattern on the image formed by each of the imaging optical systems is greater than the disparity in the second baseline direction at the predetermined distance.

3. The test method according to claim 1, wherein said measuring and said calculating and evaluating are repeated for each of blocks obtained by dividing each of the image sensor planes so that contrast exists on the geometric pattern formed on each of the image sensor planes, and said test method further comprises determining that the compound-eye distance measuring apparatus passes a test when the number of the blocks for which the difference is evaluated, in said calculating and evaluating, to be within the predetermined value range is equal to or greater than a predetermined number.

4. The test method according to claim 1,
wherein, in said placing, the chart is placed in which gradations of the elements in the geometric pattern are cyclically changed in the first baseline direction and the second baseline direction.

5. The test method according to claim 1,
wherein, in said placing, the chart is placed in which shapes of the elements in the geometric pattern are cyclically changed in the first baseline direction and the second baseline direction.

6. The test method according to claim 1,
wherein, in said placing, the chart is placed in which sizes of the elements in the geometric pattern are cyclically changed in the first baseline direction and the second baseline direction.

7. The test method according to claim 1,
wherein, in said placing, the chart is placed in which orientations of the elements in the geometric pattern are cyclically changed in the first baseline direction and the second baseline direction.

8. A chart for use in evaluating accuracy of a distance measured by a compound-eye distance measuring apparatus which measures a distance to a measurement object based on a disparity in a first baseline direction and a disparity in a second baseline direction that are obtained from at least three imaging optical systems, the first baseline direction and the second baseline direction being different from each other,
wherein, on said chart, elements in a predetermined geometric pattern are two-dimensionally arranged in a first arrangement direction and a second arrangement direction, the first arrangement direction being tilted by a predetermined angle with respect to the first baseline direction, and the second arrangement direction being tilted by a predetermined angle with respect to the second baseline direction.

9. The chart according to claim 8,
wherein an angle of the first arrangement direction with respect to the first baseline direction is set so that a pitch which is a period for repeating, in the first baseline direction, the arrangement of the elements in the geometric pattern on an image formed by each of the imaging optical systems is greater than the disparity in the first baseline direction at a predetermined distance, and an angle of the second arrangement direction with respect to the second baseline direction is set so that a pitch which is a period for repeating, in the second baseline direction, the arrangement of the elements in the geometric pattern on the image formed by each of the imaging optical systems is greater than the disparity in the second baseline direction at the predetermined distance.

10. The chart according to claim 8,
wherein gradations of the elements in the geometric pattern are cyclically changed in the first baseline direction and the second baseline direction.

11. The chart according to claim 8,
wherein shapes of the elements in the geometric pattern are cyclically changed in the first baseline direction and the second baseline direction.

12. The chart according to claim 8,
wherein sizes of the elements in the geometric pattern are cyclically changed in the first baseline direction and the second baseline direction.

13. The chart according to claim 8,
wherein orientations of the elements in the geometric pattern are cyclically changed in the first baseline direction and the second baseline direction.

14. The chart according to claim 8,
wherein at least two of the gradations, the shapes, the sizes, and the orientations are cyclically changed in the first baseline direction and the second baseline direction.

15. The chart according to claim 14,
wherein one of the gradations, the shapes, the sizes, and the orientations of the elements in the geometric pattern is cyclically changed in n ($\geqq 2$) steps in the first baseline direction and the second baseline direction, an other one of the gradations, the shapes, the sizes, and the orientations of the elements in the geometric pattern is cyclically changed in m ($\geqq 2$) steps in the first baseline direction and the second baseline direction, and the n and the m are different values.

16. A test apparatus which evaluates accuracy of a distance measured by a compound-eye distance measuring apparatus which measures a distance to a measurement object based on a disparity in a first baseline direction and a disparity in the second baseline direction that are obtained from at least three imaging optical systems, the first baseline direction and the second baseline direction being different from each other, said test apparatus comprising:
a chart placed on optical axes of the imaging optical system at a predetermined distance from the imaging optical systems;
a storage unit in which the predetermined distance is stored;
a measured distance obtaining unit configured to obtain a distance to said chart measured by the compound-eye distance measuring apparatus; and
an evaluation unit configured to evaluate whether or not a difference between the predetermined distance and the measured distance is within a predetermined value range,
wherein, on said chart, elements in a predetermined geometric pattern are two-dimensionally arranged in a first arrangement direction and a second arrangement direction, the first arrangement direction is tilted by a predetermined angle with respect to the first baseline direction, and the second arrangement direction is tilted by a predetermined angle with respect to the second baseline direction.

* * * * *